United States Patent
Miyano

(10) Patent No.: US 7,218,454 B2
(45) Date of Patent: May 15, 2007

(54) ENDOSCOPE OBJECTIVE LENS

(75) Inventor: Hitoshi Miyano, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/434,809

(22) Filed: May 17, 2006

(65) Prior Publication Data
US 2006/0268424 A1 Nov. 30, 2006

(30) Foreign Application Priority Data
May 24, 2005 (JP) .............................. 2005-151480

(51) Int. Cl.
*G02B 21/02* (2006.01)
*G02B 9/12* (2006.01)
(52) U.S. Cl. ..................... 359/661; 359/784
(58) Field of Classification Search ........ 359/656–661, 359/784
See application file for complete search history.

(56) References Cited

U.S. PATENT DOCUMENTS

| | | | |
|---|---|---|---|
| 4,984,878 A * | 1/1991 | Miyano | 359/783 |
| 5,223,982 A * | 6/1993 | Suzuki et al. | 359/716 |
| 5,418,649 A * | 5/1995 | Igarashi | 359/716 |
| 7,027,231 B2 * | 4/2006 | Miyano | 359/661 |

FOREIGN PATENT DOCUMENTS

JP   2-176612 A   7/1990
JP   9-68647 A   3/1997
JP   2004-264835 A   9/2004

* cited by examiner

*Primary Examiner*—Scott J. Sugarman
(74) *Attorney, Agent, or Firm*—Birch, Stewart, Kolasch & Birch, LLP

(57) ABSTRACT

To provide an endoscope objective lens which has a lens constitution of a relatively small number of three pieces, a short total length of lens, and various kinds of good optical performances starting with curvature of field. It is constituted of a first lens $L_1$ directing its concave surface to the image side, a second lens $L_2$ made of a positive meniscus lens directing its convex surface to the image side, and a third lens $L_3$ made of a planoconvex lens directing its convex surface to the object side arranged sequentially from the object side, and a stop placed between said first lens $L_1$ and said second lens $L_2$. It also satisfies the following Conditional Expressions:

$$2.00 < |f_1/f| < 3.00, \quad (1)$$

$$0.50 < |f_2/f_3| < 0.70, \quad (2)$$

$$2.00 < |f_1/d_{1\text{-}2}| < 5.00, \quad (3)$$

$$0.40 < |R_{2R}/R_{2F}| < 0.60. \quad (4)$$

Note that f is the focal length of the whole system, $f_1$–$f_3$ the focal lengths of the first-third lenses, respectively, $d_{1\text{-}2}$ the air distance between the first lens and the second lens, $R_{2F}$ the radius of curvature of the object-side surface of the second lens, and $R_{2R}$ the radius of curvature of the image-side surface of the second lens.

6 Claims, 6 Drawing Sheets

EXAMPLE 1

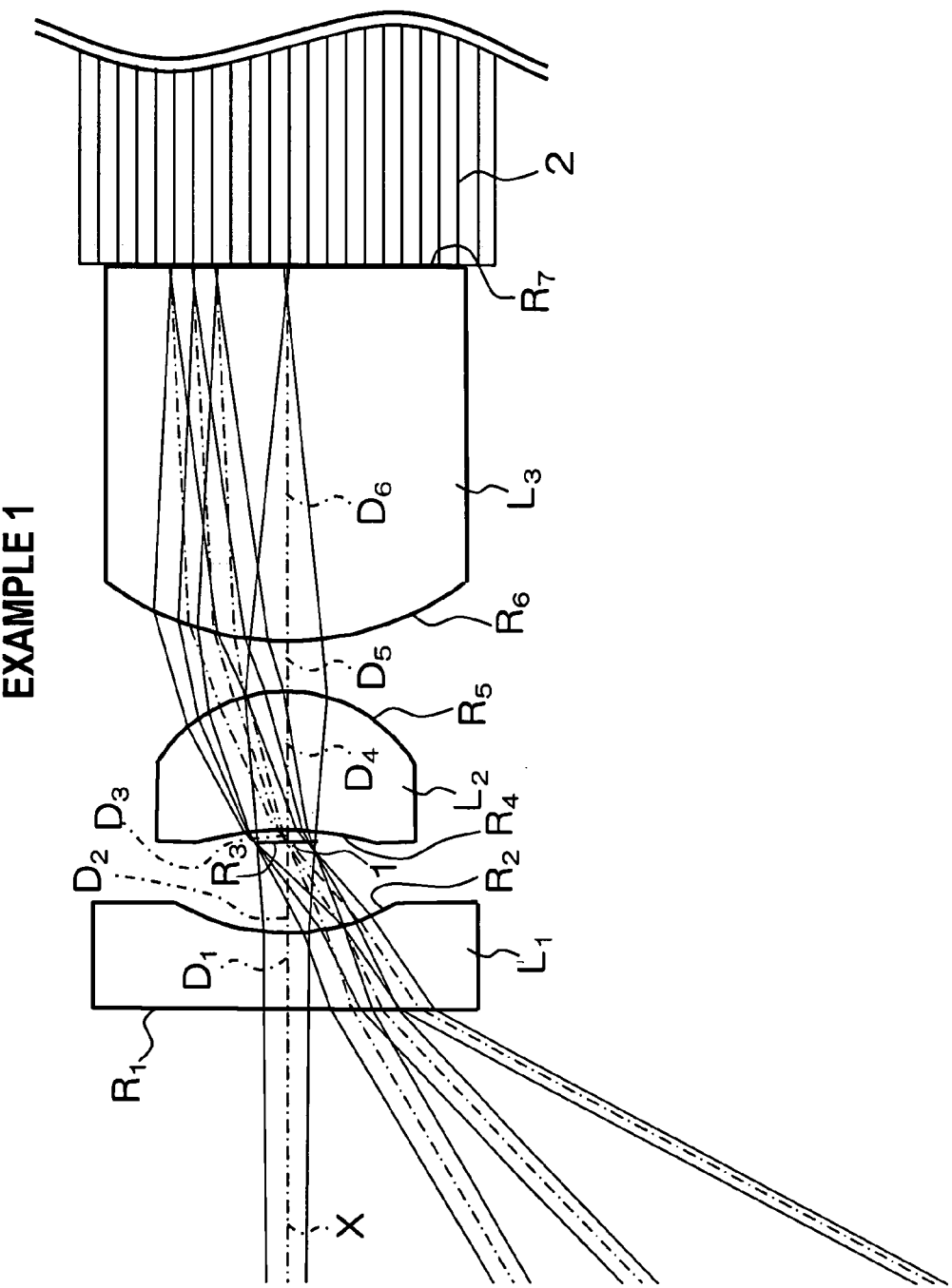

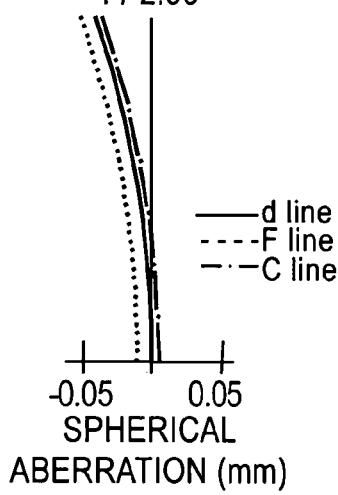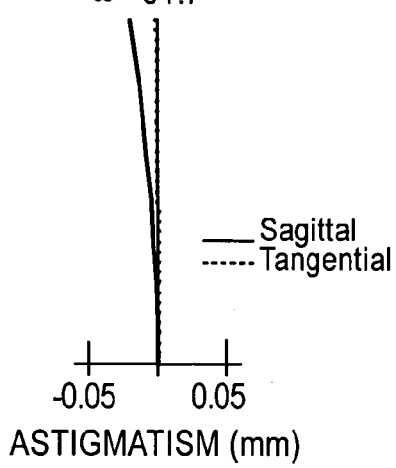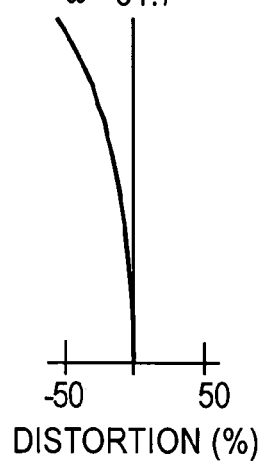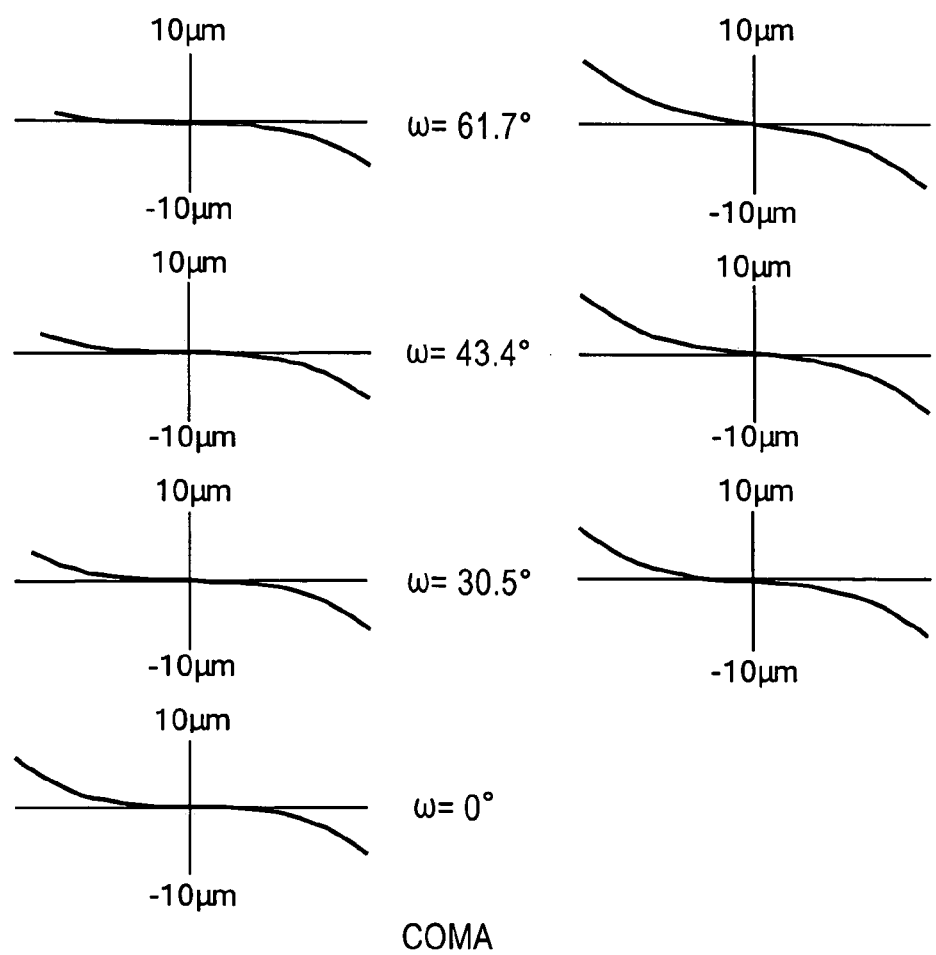

EXAMPLE 2

EXAMPLE 2
F/ 3.11

SPHERICAL ABERRATION (mm)

EXAMPLE 2
ω= 59.6

ASTIGMATISM (mm)

EXAMPLE 2
ω= 59.6

DISTORTION (%)

EXAMPLE 2

COMA

COMPARATIVE EXAMPLE

COMPARATIVE EXAMPLE

COMPARATIVE EXAMPLE

COMPARATIVE EXAMPLE

COMPARATIVE EXAMPLE

ENDOSCOPE OBJECTIVE LENS

RELATED APPLICATIONS

This application claims the priority of Japanese Patent Application No. 2005-151480 filed on May 24, 2005, which is incorporated herein by reference.

BACKGROUND OF THE INVENTION

1. Field of the Invention

The present invention relates to an endoscope objective lens which is placed at the tip section of an endoscope and comprises a compact objective lens.

2. Description of the Prior Art

Conventionally, endoscopes are utilized for places which is difficult to see directly, especially inside human bodies. As its objective lens system, various kinds constituted of multiple lens pieces are known.

Among them, shown in Japanese Unexamined Patent Publication No. H2-176612 for example is the one where the space for focus adjustment is reduced to make the total length of the objective lens shorter. However, there was a problem that it was difficult to suppress coma and astigmatism in this objective lens unless an aspheric lens was used, which impaired processibility and increased manufacturing cost. Also, proposed in Japanese Unexamined Patent Publication No. H9-68647 is the one which has a three-piece constitution of negative, positive, and positive from the object side, and is short in total lens length, there was a problem that correction of astigmatism was insufficient. Therefore, the inventor of the present application proposes an endoscope objective lens having a three-piece constitution described in Japanese Unexamined Patent Publication No. 2004-264835 which can solve these problems.

Conventionally, it was thought that even the invention proposed in the above-mentioned Japanese Unexamined Patent Publication No. 2004-264835 could be used practically with no problem. However, in the technology described in this publication document, sufficient consideration is not always given in the respect of the correction of curvature of field, thus an endoscope objective lens of higher performance has been demanded by the actual field of medical practices.

SUMMARY OF THE INVENTION

The present invention was made considering the situation, and has an objective of providing an endoscope objective lens which has a lens constitution of a relatively small number of three pieces, a short total length of lens, and various kinds of good optical performances starting with correction of curvature of field.

The endoscope objective lens of the present invention comprises successively from the object side: a first lens directing its concave surface to the image side; a second lens made of a positive meniscus lens directing its convex surface to the image side; a third lens made of a planoconvex lens directing its convex surface to the object side; and a stop placed between the first lens and the second lens; wherein the following Conditional Expressions (1) to (4) are satisfied:

$$2.00 < |f_1/f| < 3.00 \tag{1}$$

$$0.50 < |f_2/f_3| < 0.70 \tag{2}$$

$$2.00 < |f_1/d_{1-2}| < 5.00 \tag{3}$$

$$0.40 < |R_{2R}/R_{2F}| < 0.60 \tag{4}$$

and wherein
- f: Focal length of the whole system,
- $f_1$: Focal length of the first lens,
- $f_2$: Focal length of the second lens,
- $f_3$: Focal length of the third lens,
- $d_{1-2}$: Air gap between the first lens and the second lens,
- $R_{2F}$: Radius of curvature of the object-side surface of the second lens,
- $R_{2R}$: Radius of curvature of the image-side surface of the second lens.

Here, as the examples of the "a first lens directing its concave surface to the image side", there are a planoconcave lens directing its concave surface to the image side, a negative meniscus lens directing its concave surface to the image side, a biconcave lens directing a surface with a stronger curvature to the image side, etc.

It is desirable that the object-side surface of the first lens and the image-side surface of the third lens are planar, and the image-side surface of the first lens, the surfaces of both sides of the second lens, and the object-side surface of the third lens are spherical.

Further, it is preferable that the first lens is made of a negative meniscus lens directing its concave surface to the image side or a biconcave lens directing a surface with stronger curvature to the image side.

Also, it is desirable that the image-side surface of the third lens is cemented with the end face of an optical fiber bundle or the end face glass of an imaging element.

Then, it is desirable that each surface of the first lens, the second lens, and the third lens are made of a spherical or planar surface.

Still further, it is preferable that the following conditional expression (5) is satisfied:

$$0.42 < |R_{2R}/R_{2F}| < 0.50 \tag{5}$$

BRIEF DESCRIPTION OF THE DRAWINGS

FIG. 1 is a schematic drawing showing the constitution of an endoscope objective lens of according to Example 1 of the present invention;

FIGS. 2A to 2D are aberration charts showing various aberrations (spherical aberration, astigmatism, coma, and distortion) of the endoscope objective lens of Example 1;

DESCRIPTION OF THE PREFERRED EMBODIMENTS

Figure 3:
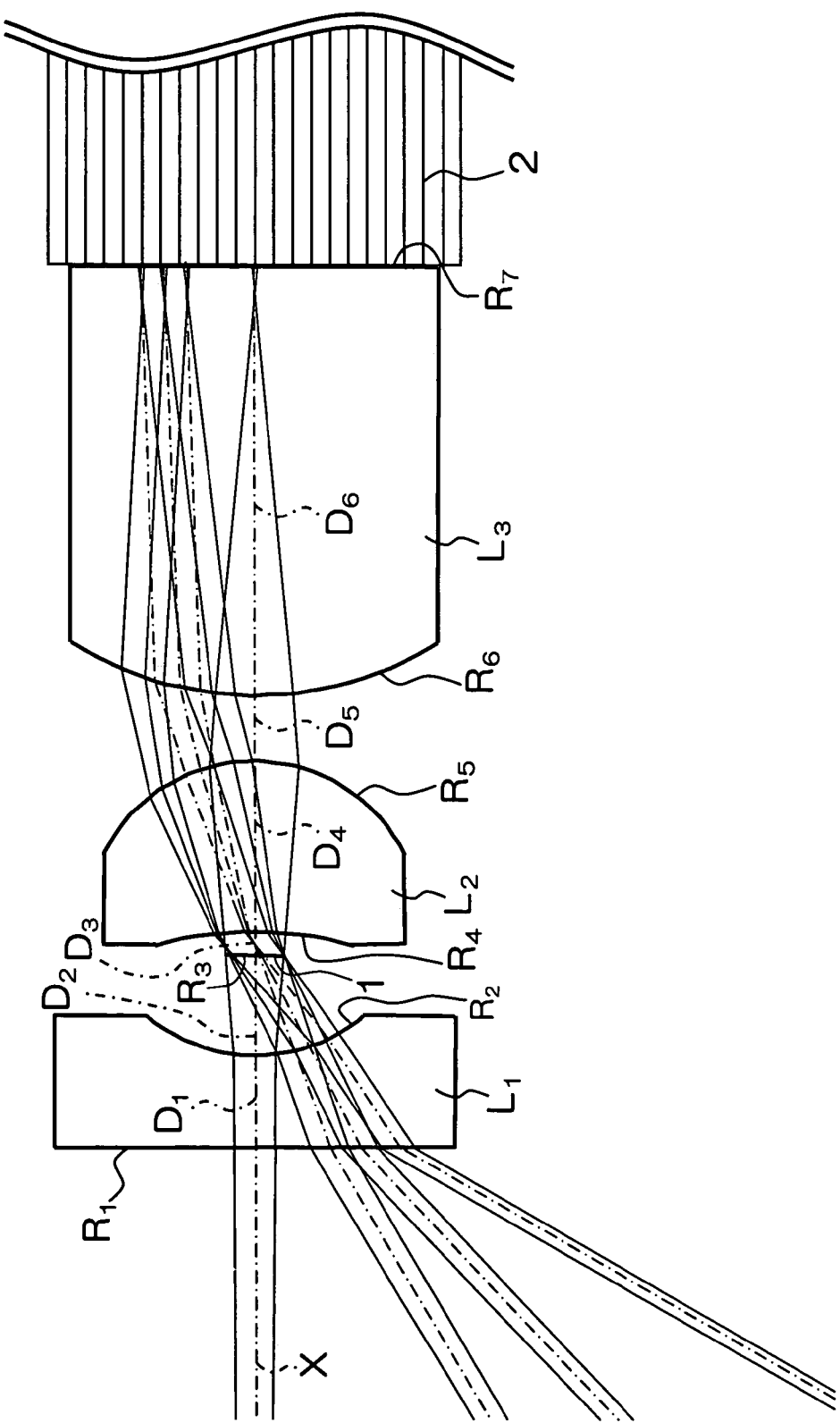
FIG. 3 is a schematic drawing showing the constitution of an endoscope objective lens according to Example 2 of the present invention.
Figure 4A:
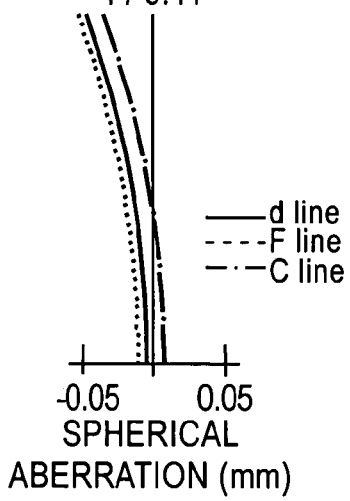
FIGS. 4A to 4D are aberration charts showing various aberrations (spherical aberration, astigmatism, coma, and distortion) of the endoscope objective lens of Example 2.
Figure 4B:
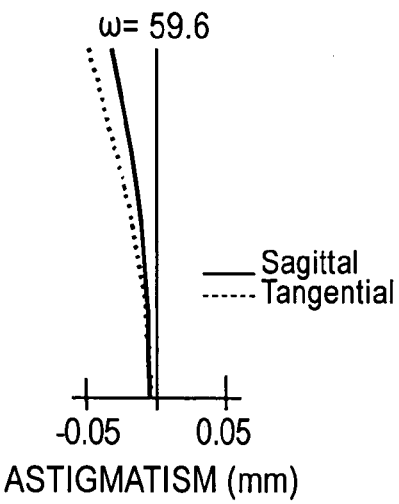
Figure 4C:
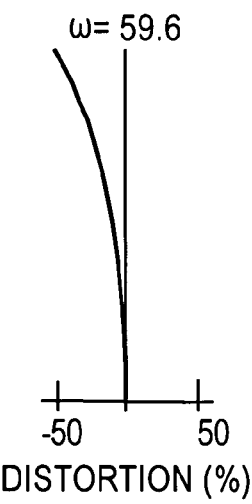
Figure 4D:
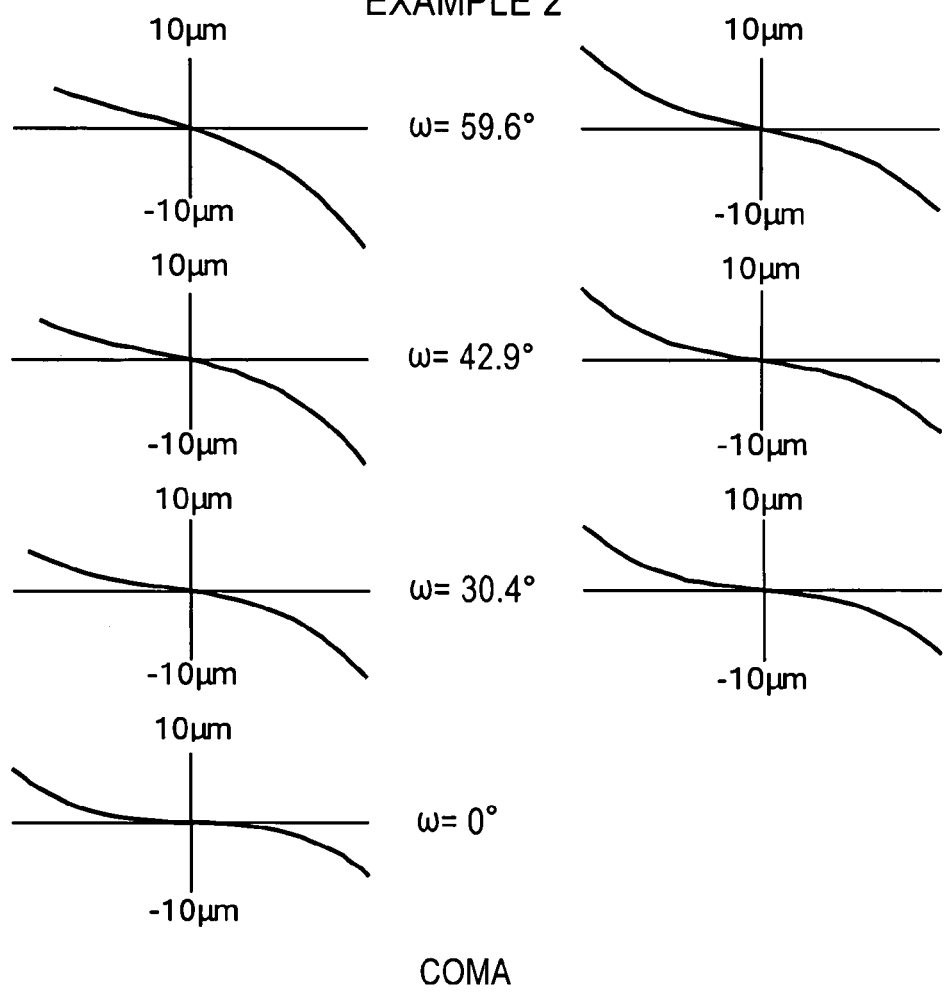

Below, concrete embodiments of the present invention are explained referring drawings. The endoscope objective lens of an embodiment (the one of Example 1 is shown as the representative) shown in FIG. 1 is an endoscope objective lens constituted of a first lens $L_1$ made of a planoconcave lens directing its concave surface to the image side, a second lens $L_2$ made of a positive meniscus lens directing its convex surface to the image side, and a third lens $L_3$ made of a planoconvex lens directing its convex surface to the object side arranged successively from the object side, and a stop 1 placed between the first lens $L_1$ and the second lens $L_2$, where the object-side surface of the first lens $L_1$ and the image-side surface of the third lens $L_3$ are planar, and the image-side surface of the first lens $L_1$, the surfaces of both sides of the second lens $L_2$, and the object-side surface of the third lens $L_3$ are spherical. Further, the image-side surface of the third lens $L_3$ is cemented with the end face of an optical fiber bundle 2.

Note that the first lens $L_1$ may be a negative meniscus lens directing its concave surface to the image side or a biconcave lens directing a surface with stronger curvature to the image side. Note that the surfaces of both sides of the first lens $L_1$ is made spherical in this case.

Also, the endoscope objective lens of this embodiment satisfies the following Conditional Expressions (1) to (4):

$$2.00<|f_1/f|<3.00 \quad (1)$$

$$0.50<|f_2/f_3|<0.70 \quad (2)$$

$$2.00<|f_1/d_{1\text{-}2}|<5.00 \quad (3)$$

$$0.40<|R_{2R}/R_{2F}|<0.60 \quad (4)$$

wherein f: Focal length of the whole system,
$f_1$: Focal length of the first lens,
$f_2$: Focal length of the second lens,
$f_3$: Focal length of the third lens,
$d_{1\text{-}2}$: Air gap between the first lens and the second lens,
$R_{2F}$: Radius of curvature of the object-side surface of the second lens,
$R_{2R}$: Radius of curvature of the image-side surface of the second lens.

Below, technical significances of the Conditional Expressions (1) to (4) are explained.

The Conditional Expression (1) defines the power range of the first lens, wherein exceeding the upper limit of this Conditional Expression (1) makes it difficult to secure sufficient viewing angle. On the other hand, going below the lower limit of Conditional Expression (1) makes the negative power stronger and the curvature of field excessively under.

The Conditional Expression (2) expresses the ratio of focal lengths of the second lens $L_2$ and the third lens $L_3$, wherein if the power of the third lens $L_3$ becomes stronger and exceeds the upper limit, corrections of the curvature of field and astigmatism become insufficient, and on the other hand, if it goes below the lower limit, the power of the third lens $L_3$ becomes weaker and the coma larger.

The Conditional Expression (3) determines the range of the power of the first lens and the range of distance between the first lens $L_1$ and the second lens $L_2$, wherein exceeding the upper limit of this Conditional Expression (3) makes it difficult to secure sufficient viewing angle. On the other hand, going below the lower limit of Conditional Expression (3) makes the distance between the first lens $L_1$ and the second lens $L_2$ wider and the curvature of field excessively under.

The Conditional Expression (4) defines the ratio of radii of curvature of the front and the rear of the second lens $L_2$, wherein exceeding the upper limit makes the power of the second lens $L_2$ become smaller and the total lens length longer, and on the other hand, going below the lower limit makes the curvature of field correction insufficient. Note that it is even more preferred to set the ratio of radii of curvature $R_{2R}/R_{2F}$ so that $$0.42<|R_{2R}/R_{2F}|<0.50.$$

According to the endoscope objective lens of the embodiment, curvature of field can be suppressed by making the second lens $L_2$ a positive meniscus lens directing its convex surface to the image side and satisfying the Conditional Expression (4). Note that if the second lens $L_2$ is a planoconvex lens, the value of the Conditional Expression (4) becomes 0. By the suppression of curvature of field, it becomes possible to meet the demand to provide images of even higher quality for the field of medical practices.

Also, curvature of field can be made preferable while securing a sufficient angle of view by satisfying the Conditional Expressions (1) and (3), and also good aberration corrections are made by satisfying the Conditional Expression (2).

By satisfying these four Conditional Expressions simultaneously, an endoscope objective lens can be obtained which has a short lens total length and a good optical performance in spite of its lens constitution of a relatively small number of three pieces.

Moreover, because each lens surface of the first lens $L_1$, the second lens $L_2$, and the third lens $L_3$ is made spherical or planar without using any aspheric lens, easiness of processing can be regarded as an advantage. In addition, by cementing the image-side surface of the third lens $L_3$ and the end face of the optical fiber bundle or the end face glass of the imaging element and moving these as one unit, focus adjustment task in assembling and adjustment can be made easy.

EXAMPLES

Below, the endoscope objective lens of the present invention is further explained employing concrete examples and comparative examples of conventional technology.

Note that numerical values shown in the following examples and comparative examples are values normalized assuming the focal length of the whole system as 0.5 mm.

Example 1

The schematic constitution of an endoscope objective lens of Example 1 is shown in FIG. 1. In this endoscope objective lens, a first lens $L_1$ made of a planoconcave lens directing its concave surface to the image side, a second lens $L_2$ made of a positive meniscus lens directing its convex surface to the image side, and a third lens made of a planoconvex lens directing its convex surface to the object side are arranged successively from the object side, and a stop 1 is placed between the first lens $L_1$ and the second lens $L_2$. Note that each lens surface is formed with a spherical or planar surface.

Radius of curvature R (mm) of each lens surface, center thickness of each lens and air gap between lenses D (mm) (below, these are collectively called as on-axis surface distances), and values of refractive index N and Abbe number ν of each lens at the d line of this endoscope objective lens are listed in Table 1 (follows). Note that numbers in the table indicate the order from the object side (the third surface is a stop).

Also, according to the endoscope objective lens of Example 1, as shown in Table 4 (follows), Conditional Expressions (1) to (4) are all satisfied. Then, total length of the lens system is set to 2.72 mm.

Shown in FIGS. 2A to 2D are aberration charts showing spherical aberration, astigmatism, coma, and distortion of the endoscope objective lens of Example 1. Note that shown in the astigmatism chart are aberrations for the sagittal image surface and the tangential image surface. In these aberration charts, ω indicates half angle of view. As is clear from these aberration charts, aberrations can be corrected extremely well with the A endoscope objective lens of Example 1.

Example 2

The schematic constitution of an endoscope objective lens of Example 2 is shown in FIG. 3. The constitution of this endoscope objective lens is also about the same with that of Example 1, thus the same numbers are assigned to the same elements in explaining the corresponding drawings, omitting duplicate explanations.

Radius of curvature R (mm) of each lens surface, center thickness of each lens and air gap between lenses D (mm), and values of refractive index N and Abbe number ν of each lens at the d line of this endoscope objective lens are listed in Table 2 (follows). Note that numbers in the table indicate the order from the object side (the third surface is a stop). It is clear that on-axis distances are longer in this endoscope objective lens than those in Example 1.

Also, according to the endoscope objective lens of Example 2, as shown in Table 4 (follows), Conditional Expressions (1) to (4) are all satisfied. Then, total length of the lens system is set to 3.25 mm.

Shown in FIGS. 4A to 4D are aberration charts showing spherical aberration, astigmatism, coma, and distortion of the endoscope objective lens of Example 2. Note that shown in the astigmatism chart are aberrations for the sagittal image surface and the tangential image surface. In these aberration charts, ω indicates half angle of view.

As is clear from these aberration charts, aberrations can be corrected extremely well with the endoscope objective lens of Example 2.

Comparative Examples

Figure 5:
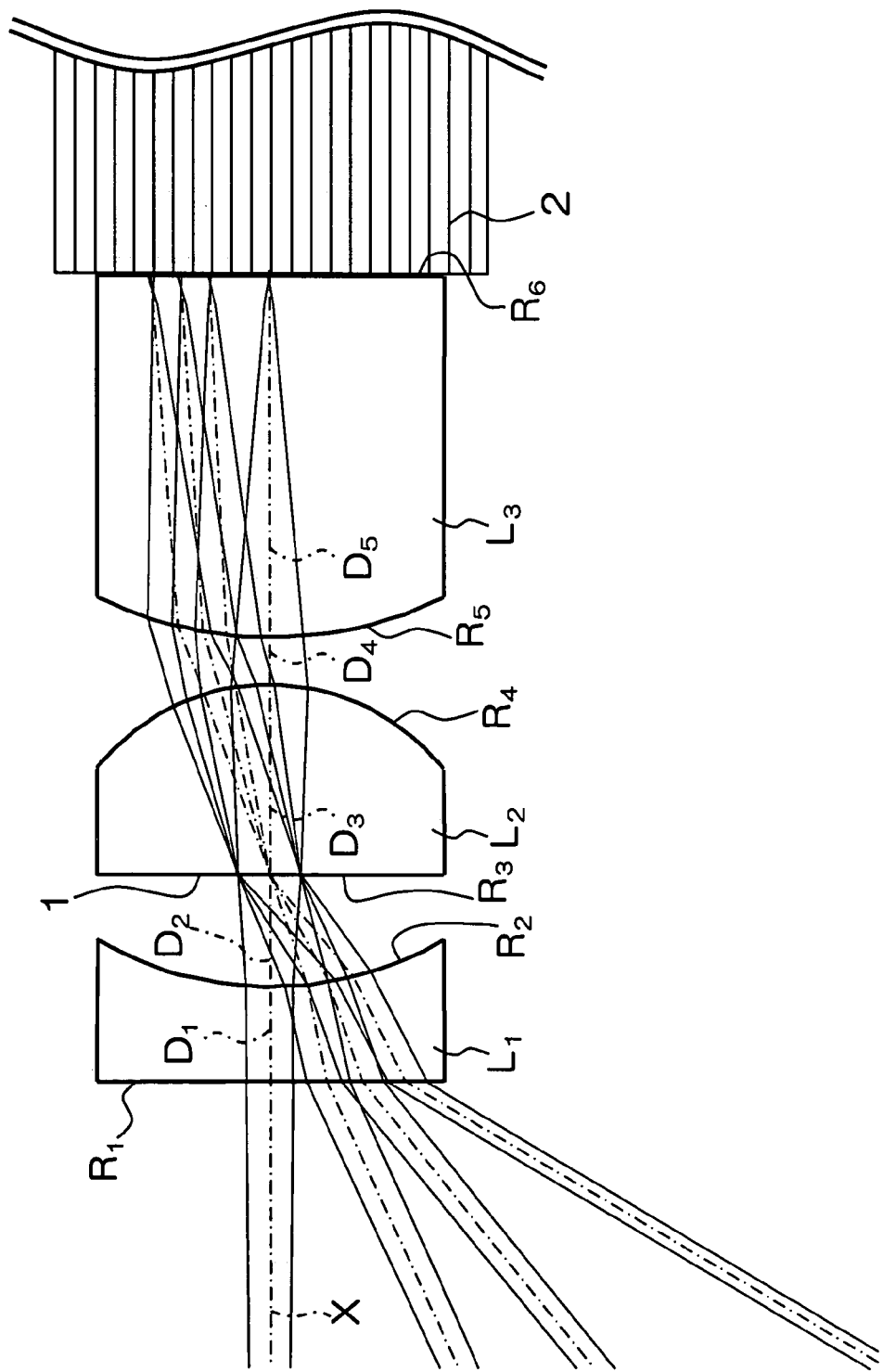
FIG. 5 is a schematic drawing showing the constitution of an endoscope objective lens according to Comparative Example of the present invention.
Figure 6A:
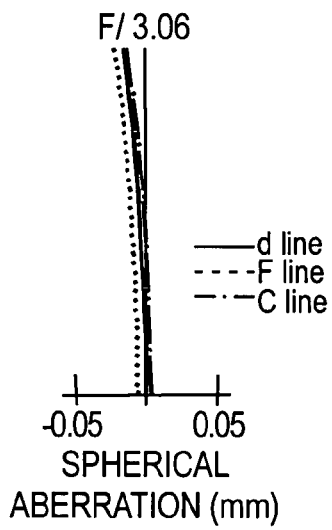
FIGS. 6A to 6D are Aberration charts showing various aberrations (spherical aberration, astigmatism, coma, and distortion) the endoscope objective lens of Comparative Example.
Figure 6B:
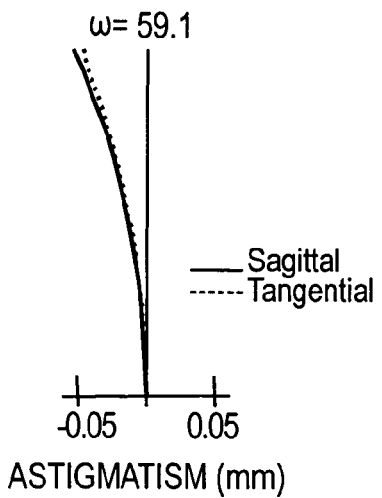
Figure 6C:
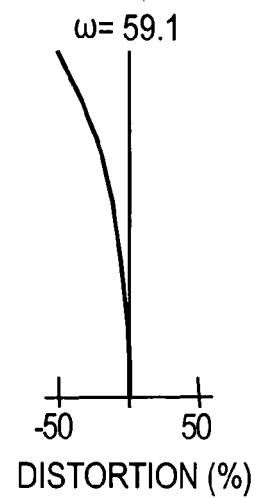
Figure 6D:
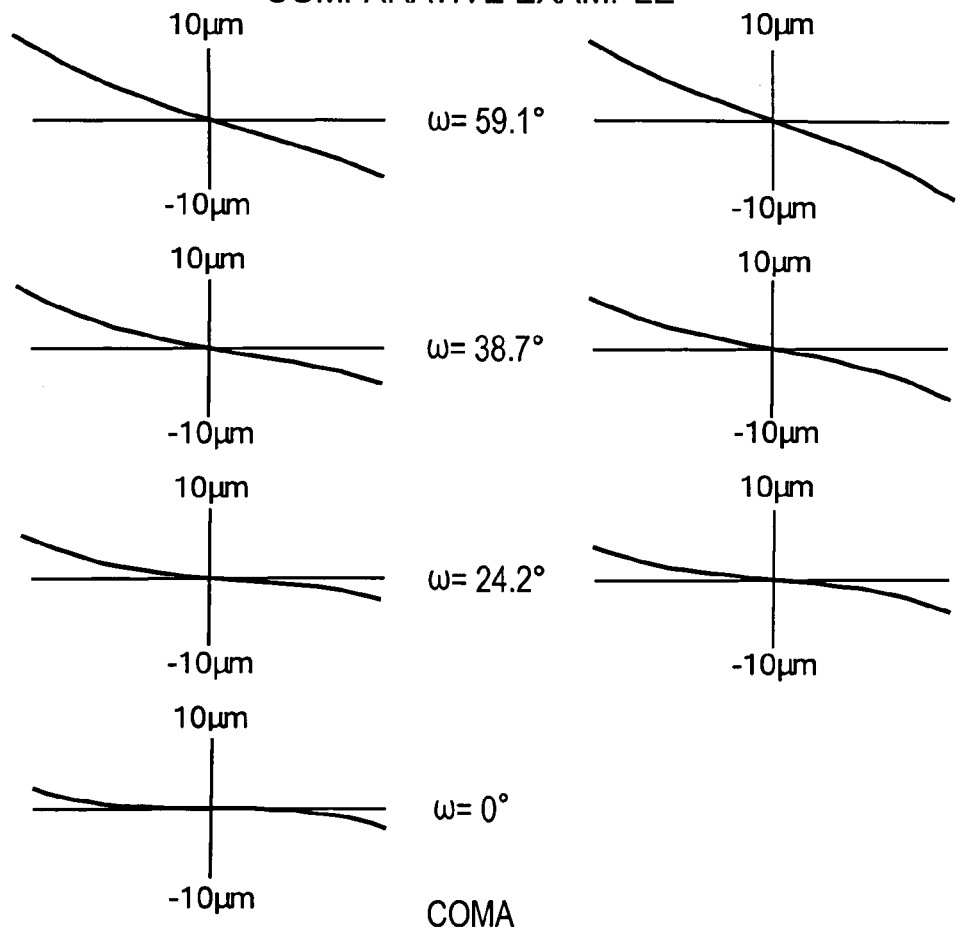

The schematic constitution of an endoscope objective lens of Comparative Example is shown in FIG. 5. In this endoscope objective lens, a first lens $L_1$ made of a planoconcave lens directing its concave surface to the image side, a second lens $L_2$ made of a planoconvex lens directing its convex surface to the image side, and a third lens $L_3$ made of a planoconvex lens directing its convex surface to the object side are arranged successively from the object side, and a stop 1 is placed on the object-side surface of the second lens $L_2$.

Radius of curvature R (mm) of each lens surface, center thickness of each lens and air gap between lenses D (mm), and values of refractive index N and Abbe number ν of each lens at the d line of this endoscope objective lens are listed in Table 3 (follows). Note that numbers in the table indicate the order from the object side.

Also, according to the endoscope objective lens of Comparative Example, values corresponding to Conditional Expressions (1) to (4) are as listed in Table 4 (follows). Although Conditional Expressions (1) to (3) are satisfied, Conditional Expression (4) is not satisfied since the second lens $L_2$ is a planoconvex lens. The total length of the lens system is set to 2.93 mm.

Shown in FIGS. 6A to 6D are aberration charts showing spherical aberration, astigmatism, coma, and distortion of the endoscope objective lens of Comparative Example. Note that shown in the astigmatism chart are aberrations for the sagittal image surface and the tangential image surface.

In the endoscope objective lens of the present invention, curvature of field can be suppressed by constituting the second lens as a positive meniscus lens directing its convex surface to the image side and satisfying the Conditional Expression (4).

By satisfying the Conditional Expressions (1) to (4) simultaneously, an endoscope objective lens can be obtained which has a short total lens length and a good optical performance in spite of a lens constitution with relatively a small number of three pieces.

TABLE 1

Example 1

| | Surface | R | D | $N_d$ | $\nu_d$ |
|---|---|---|---|---|---|
| | 1 | ∞ | 0.2782 | 1.55919 | 53.9 |
| | 2 | 0.7716 | 0.3292 | | |
| (Stop) | 3 | ∞ | 0.0464 | | |
| | 4 | −1.1240 | 0.5101 | 1.81600 | 46.7 |
| | 5 | −0.5379 | 0.1855 | | |
| | 6 | 1.0897 | 1.3711 | 1.71300 | 53.9 |
| | 7 | ∞ | | | |

TABLE 2

Example 2

| | Surface | R | D | $N_d$ | $\nu_d$ |
|---|---|---|---|---|---|
| | 1 | ∞ | 0.3399 | 1.55919 | 53.9 |
| | 2 | 0.6070 | 0.4067 | | |
| (Stop) | 3 | ∞ | 0.0486 | | |
| | 4 | −1.3658 | 0.6313 | 1.81600 | 46.7 |
| | 5 | −0.607 | 0.2428 | | |
| | 6 | 1.2407 | 1.5827 | 1.71300 | 53.9 |
| | 7 | ∞ | | | |

TABLE 3

Comparative Examples

| Surface | R | D | $N_d$ | $\nu_d$ |
|---|---|---|---|---|
| 1 | ∞ | 0.3350 | 1.90680 | 21.2 |
| 2 | 1.1720 | 0.3930 | 1.00000 | |
| 3 | ∞ | 0.6700 | 1.88300 | 40.9 |
| 4 | −0.7530 | 0.1670 | 1.00000 | |
| 5 | 1.3390 | 1.3621 | 1.88300 | 40.9 |
| 6 | ∞ | | 1.00000 | |

Stop is immediately before G2.

TABLE 4

| | | Example 1 | Example 2 | Comparative Example |
|---|---|---|---|---|
| f | | 0.500 | 0.500 | 0.500 |
| $f_1$ | | −1.380 | −1.086 | −1.292 |
| $f_2$ | | 0.909 | 0.975 | 0.853 |
| $f_3$ | | 1.528 | 1.740 | 1.516 |
| $d_{1-2}$ | | 0.376 | 0.455 | 0.393 |
| $R_{2F}$ | | −1.124 | −1.366 | ∞ |
| $R_{2R}$ | | −0.538 | −0.607 | −0.753 |
| (1) 2.00< $|f_1/f|$ | <3.00 | 2.760 | 2.171 | 2.586 |

TABLE 4-continued

|  |  |  | Example 1 | Example 2 | Comparative Example |
|---|---|---|---|---|---|
| (2) 0.50< | $\|f_2/f_3\|$ | <0.70 | 0.595 | 0.560 | 0.562 |
| (3) 2.00< | $\|f_1/d_{1-2}\|$ | <5.00 | 3.674 | 2.384 | 3.289 |
| (4) 0.40< | $\|R_{2R}/R_{2F}\|$ | <0.60 | 0.479 | 0.444 | 0.000 |

What is claimed is:

1. An endoscope objective lens comprising, successively from the object side:
   a first lens directing its concave surface to the image side;
   a second lens made of a positive meniscus lens directing its convex surface to the image side;
   a third lens made of a planoconvex lens directing its convex surface to the object side; and
   a stop placed between the first lens and the second lens;
wherein the following Conditional Expressional expressions (1) to (4) are satisfied:

$$2.00<|f_1/f|<3.00 \tag{1}$$

$$0.50<|f_2/f_3|<0.70 \tag{2}$$

$$2.00<|f_1/d_{1-2}|<5.00 \tag{3}$$

$$0.40<|R_{2R}/R_{2F}|<0.60 \tag{4}$$

and wherein
   f: Focal length of the whole system,
   $f_1$: Focal length of the first lens,
   $f_2$: Focal length of the second lens,
   $f_3$: Focal length of the third lens,
   $d_{1-2}$: Air gap between the first lens and the second lens,
   $R_{2F}$: Radius of curvature of the object-side surface of the second lens,
   $R_{2R}$: Radius of curvature of the image-side surface of the second lens.

2. The endoscope objective lens according to claim 1, wherein the object-side surface of said first lens and the image-side surface of said third lens are planar, and the image-side surface of said first lens, the surfaces of both sides of said second lens, and the object-side surface of said third lens are spherical.

3. The endoscope objective lens according to claim 1, wherein said first lens is made of a negative meniscus lens directing its concave surface to the image side or a biconcave lens directing a surface with stronger curvature to the image side.

4. The endoscope objective lens according to claim 1, wherein the image-side surface of said third lens is cemented with the end face of an optical fiber bundle or the end face glass of an imaging element.

5. The endoscope objective lens according to claim 1, wherein each surface of said first lens, said second lens, and said third lens are made of a spherical or planar surface.

6. The endoscope objective lens according to claim 1, wherein the following conditional expressions (5) is satisfied:

$$0.42<|R_{2R}/R_{2F}|<0.50 \tag{5}$$

* * * * *